UNITED STATES PATENT OFFICE.

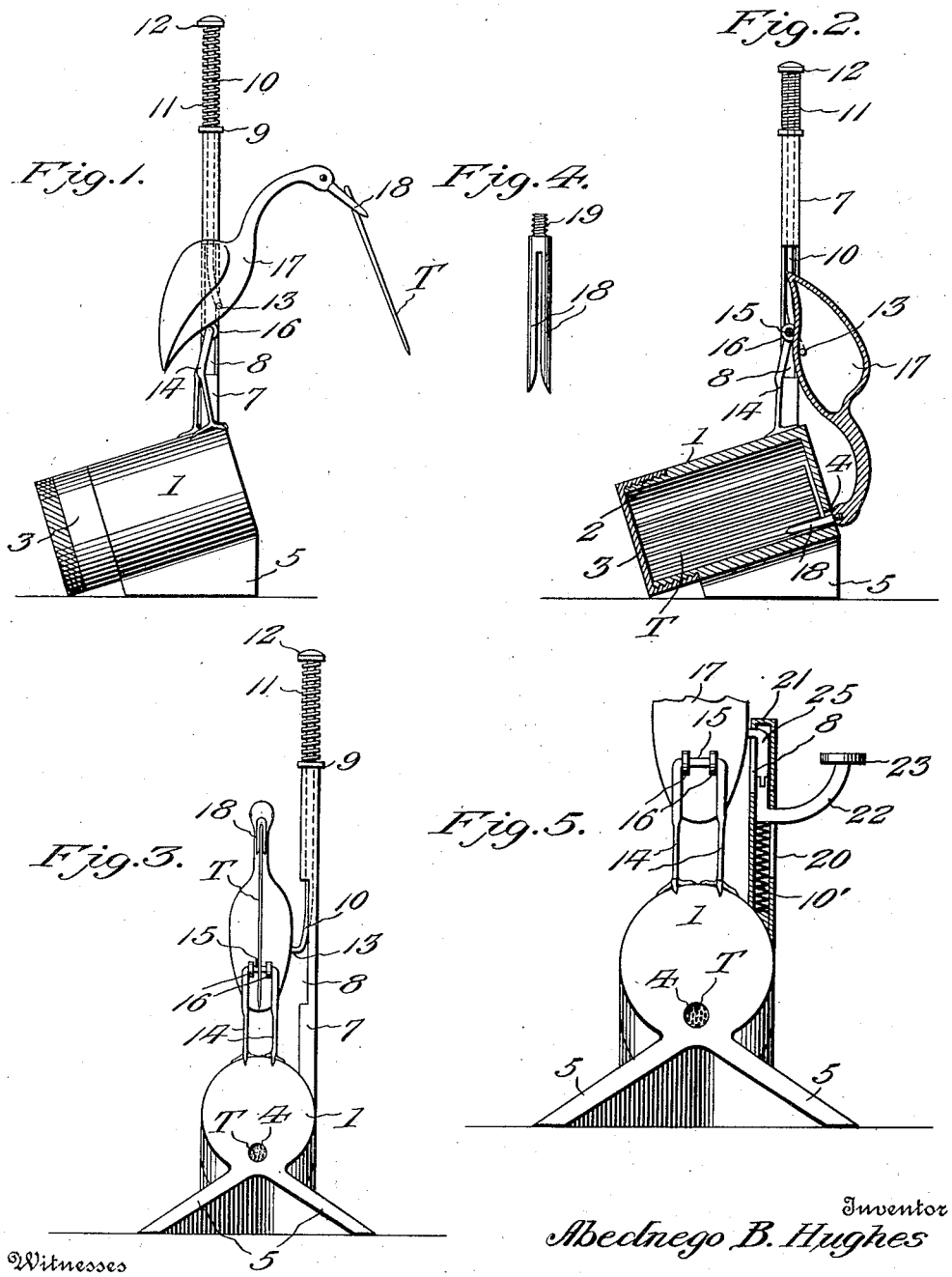

ABEDNEGO B. HUGHES, OF CEDARVILLE, CALIFORNIA.

SINGLE-DELIVERY TOOTHPICK-HOLDER.

1,077,715.

Specification of Letters Patent.

Patented Nov. 4, 1913.

Application filed May 2, 1912. Serial No. 694,651.

*To all whom it may concern:*

Be it known that I, ABEDNEGO B. HUGHES, a citizen of the United States, and a resident of Cedarville, in the county of Modoc and State of California, have invented certain new and useful Improvements in Single-Delivery Toothpick-Holders, of which the following is a specification, reference being had to the accompanying drawings.

This invention has relation to certain new and useful improvements in single delivery apparatus used in distributing and vending tooth picks and matches; and the primary object of my invention is to provide an attractive single delivery apparatus of a simple and inexpensive nature and durable construction arranged so that the tooth picks or matches can be positively removed from the holder with ease accuracy and despatch, one at a time.

With these and other objects in view, the present invention consists in the combination and arrangement of parts as will be hereinafter more fully described and finally pointed out in the appended claims, it being further understood that changes in the specific structure shown and described may be made within the scope of the claim without departing from the spirit of the invention.

In the accompanying drawings forming a part of this specification and in which like numerals of reference indicate similar parts in the several views: Figure 1, shows a side elevational view of a single delivery apparatus embodying my invention. Fig. 2, is a central sectional view disclosing the pivotally held member in its downwardly thrown position. Fig. 3, is a front view. Fig. 4, is an enlarged detached detail of the resilient bifurcated stem. Fig. 5, shows a modification.

In my present invention I provide an attractive, sanitary device especially adapted to be used as a single delivery tooth pick holder, though the same may also be used as a match holder.

In carrying out the aim of my invention I employ a preferably cylindrical receptacle 1, having its rear portion 2, exteriorly threaded to receive the cap 3. Secured to the holder 1, is a V-shaped base 5, of such a shape that the receptacle 1, will be obliquely held as disclosed in the drawings. This receptacle is provided with an aperture 4, within the lowermost portion of its elevated end, as shown in Fig. 2. Secured adjacent to the receptacle is a tubular standard 7, which at the point intermediate of its ends and above the receptacle 1, has an access opening 8, this being more clearly shown in Fig. 3. Slidably held within the tubular standard 7, is a resilient operating bar 10; one end of which projects beyond the tubular standard and ends in an operating knob 12, the remaining end 13, being bent at right angles and forming a crank.

Secured to the upper portion of the receptacle 1, is a supporting frame which in the drawings is shown as comprising the top portion 15, and the upright portions 14, this frame being shown in the form of a stork's legs. Pivotally held to the upper portion 15, of the frame is a member 17, in the drawings resembling the body of a stork. This stork shaped member has the eyes 16, more clearly shown in Fig. 2, pivotally held to the portion 15, the crank end 13, of the operating bar entering the body which is preferably hollow as disclosed in Fig. 2. Secured in what forms the head of this member 17, is a bifurcated resilient stem 18, having a threaded end 19, by means of which this stem is secured. This stem represents the beak of the stork the neck of which is of such a length that when the member is moved on its standard, the beak 18, will enter the aperture 4.

To normally hold the member 17, in upright position a coil spring 11, is interposed between the operating head 12, and the collar 9, and secured to the operating end of the standard 7, this construction being shown in Figs. 1 and 3.

On removing the cap 3, the receptacle can be charged with the tooth picks T. Now when it is desired to remove a tooth pick the operator depresses the bar 13, which results in the member 17, being tilted so that the beak 18, with force enters the aperture 4, and clasps one of the tooth picks. On releasing the bar 10, the spring 11, throws the member 17, upward as shown in Figs. 1 and 3, while a tooth pick or match will be clamped within the resilient stem 18. The bill or resilient stem 18, is of such a width that but one tooth pick or match at a time can be removed.

From the foregoing it will be seen that a separate operation is required to remove each tooth pick. As the receptacle is round the tooth picks will gather at the bottom where the opening or aperture 4, is located so that the very last tooth pick can be removed. Owing to the shape and position of the receptacle the tooth picks automatically aline themselves.

While I have shown a stork, it is of course understood that some other shape could be imparted to the pivotally held member 17.

On tilting the member 17, downward the resilient bar 10, gives sufficiently so that the member can be easily actuated.

In Fig. 5, I show a modification in which the tubular standard 21, has the slots 8 and 20, the spring 10, being held within the standard. Extending through the opening 20, is the arm 22, of an operating member having the head 23. To this member 22, is pivotally secured the crank 25, which crank in turn is secured to the body 17. The operation is as has been described in connection with the preferred form.

As shown in Fig. 3, the access opening 8, is of a sufficient size so that the crank 13, can move outward and inward during the operation of the body 17.

A single delivery apparatus constructed acording to my invention forms an attractive device which can be cheaply made and readily operated.

Having thus described my said invention, what I claim as new and desire to secure by United States Letters Patent is:

1. The combination with an obliquely held receptacle having an aperture within the lowest portion of its elevated end, of a tubular standard secured adjacent to said receptacle having an access opening intermediate of its ends, an operating bar within and projecting above said standard the lower end being bent at right angles to form a crank extending through said access opening, a supporting frame secured to said receptacle, a member pivotally held to said supporting frame said crank being secured to said member, a resilient bifurcated stem carried by said pivotally held member arranged to enter said aperture, and a spring to normally force said operating bar into a protracted position.

2. The combination with an obliquely held receptacle having an aperture within the lowest portion of its elevated end, of a tubular standard secured adjacent to said receptacle having an access opening intermediate of its ends, an operating bar within and projecting above said standard the lower end being bent at right angles to form a crank extending through said access opening, a supporting frame secured to said receptacle, a member pivotally held to said supporting frame said crank being secured to said member, a resilient bifurcated stem carried by said pivotally held member arranged to enter said aperture, and a head secured to said bar, said spring being interposed between said head and said standard.

In testimony whereof I affix my signature, in presence of two witnesses.

ABEDNEGO B. HUGHES.

Witnesses:
C. M. JOHNSTONE,
WM. R. HAMILTON.

---

Copies of this patent may be obtained for five cents each, by addressing the "Commissioner of Patents, Washington, D. C."